United States Patent [19]

Van Brimer et al.

[11] 3,803,628

[45] Apr. 9, 1974

[54] APPARATUS AND METHOD FOR POSTIONALLY CONTROLLED DOCUMENT MARKING

[75] Inventors: Russel H. Van Brimer, Oakwood; Edward R. Thomas, Kettering; Dale R. Beam, Dayton, all of Ohio

[73] Assignee: The Mead Corporation, Dayton, Ohio

[22] Filed: Dec. 18, 1972

[21] Appl. No.: 316,093

[52] U.S. Cl. .................. 346/1, 250/219 DR, 346/75

[51] Int. Cl. ......................... G01d 5/26, G01d 15/18

[58] Field of Search...346/75, 250/219 DR, 219 WD

[56] References Cited

UNITED STATES PATENTS

| | | | |
|---|---|---|---|
| 3,350,545 | 10/1967 | Street | 250/219 DR |
| 3,484,793 | 12/1969 | Weigl | 346/75 |
| 3,555,558 | 1/1971 | Sherman | 346/75 |
| 3,577,198 | 5/1971 | Beam | 346/75 |

*Primary Examiner*—Joseph W. Hartary

*Attorney, Agent, or Firm*—Biebel, French & Bugg

[57] ABSTRACT

There is disclosed a system for controlling the positioning of graphic information being marked on a moving document. The graphic information is marked by a row of marking elements, preferably ON/OFF switched ink jets. The marking elements are provided in sufficient number for progressively marking a band wider than the area to be marked on the document. A charge ring control register produces marking by only that number of jets required for marking the graphic information.

The loading of the marking data in the charge ring control register is under the control of a margin control shift register, which in turn is loaded by the output of a series of document edge detecting photo sensors. A digital tachometer monitors the document speed and synchronizes printing with document movement.

There are disclosed two alternate embodiments for providing charge ring control information. In one embodiment the information is provided by character select apparatus and a series of character matrices. In the other embodiment the information is provided by a preprogrammed tape and a tape reader. In both embodiments the information is loaded into a line control shift register and is thereafter serially transferred therefrom for loading into the charge ring control register.

15 Claims, 3 Drawing Figures

APPARATUS AND METHOD FOR POSTIONALLY CONTROLLED DOCUMENT MARKING

BACKGROUND OF THE INVENTION

This invention relates to document marking and more particularly to the marking of information within a designated area on a document. There are presently available many types of systems for marking or printing of moving webs or stacked sheets of paper. However, there exists a need for marking of information on previously prepared documents which may be business forms, envelopes, newspapers or the like. For marking such documents it is desirable that the marking apparatus not make direct contact with the document so as to enable printing of documents of different thickness or with different types of surface texture. A typical noncontact prior art document marking apparatus is shown for instance in Lovelady et al. U.S. Pat. No. 3,596,276 and comprises an ink drop generator and means for controlling the drops issuing therefrom.

Typical applications for such document markers include the printing of mailing addresses on magazines and newspapers, printing data on preprinted business forms, and printing bar codes on envelopes for automatic mail sorting. It will be appreciated that such documents often times require printing at any of several different transverse locations. Alternatively, as in the case of bar code printing for envelopes, the document may be transported with a relatively large transverse positioning error but yet require that graphic information be printed with extreme accuracy in a previously designated area.

SUMMARY OF THE INVENTION

This invention provides improved apparatus and method for progressively marking a band of graphic information on a moving document. The marking is performed by a series of marking elements which are capable of interchangeable use and placed at different locations relative to a predefined marking zone. Collectively these marking elements are capable of marking an area wider than the band to be marked, so that the required marking may be performed by a group of marking elements selected from the entire set of such elements.

Depending upon the desired location for the marked band of graphic information, certain of the marking elements are activated for marking while the remainder are placed in a non-marking mode. Thus the system may be used for marking information at the same relative locations upon documents transported through the marking zone along different pass lines or tracks, or, alternatively the system may mark the same information at different transverse locations upon similarly transported documents.

For operation as above described, it is preferable that the marking elements not be in direct contact with the document being marked, and most preferably the marking elements are a row of liquid jet marking streams. Thes streams are switched on and off by connection to a charge ring control register which in turn is loaded with printing information under the control of a sensor which monitors the position of an edge of the document. There is a margin control register which is loaded by this sensor, and the margin control register in turn controls the loading of information into the charge ring control register. A wide variety of edge sensors are available for loading the margin control register, but preferably the edge sensor comprises a row of photo detectors. Preferably also, the marking is synchronized with document movement by measuring the document movement rate and initiating the loading of the margin control register in response thereto.

Accordingly it is an object of this invention to mark a band of graphic information within a desired area on the face of a document. It is another object of this invention to provide for marking graphic information accurately within previously desired designated areas on variably positioned documents. Still another object of the invention is to provide for marking graphic information at various transverse locations on progressively moving documents. A further object of the invention is to provide improved jet drop printing apparatus for recording a band of graphic information on the face of a document.

Other objects and advantages of the invention will be apparent from the following description, the accompanying drawings and the appended claims.

DESCRIPTION OF THE PREFERRED EMBODIMENT

Figure 1:
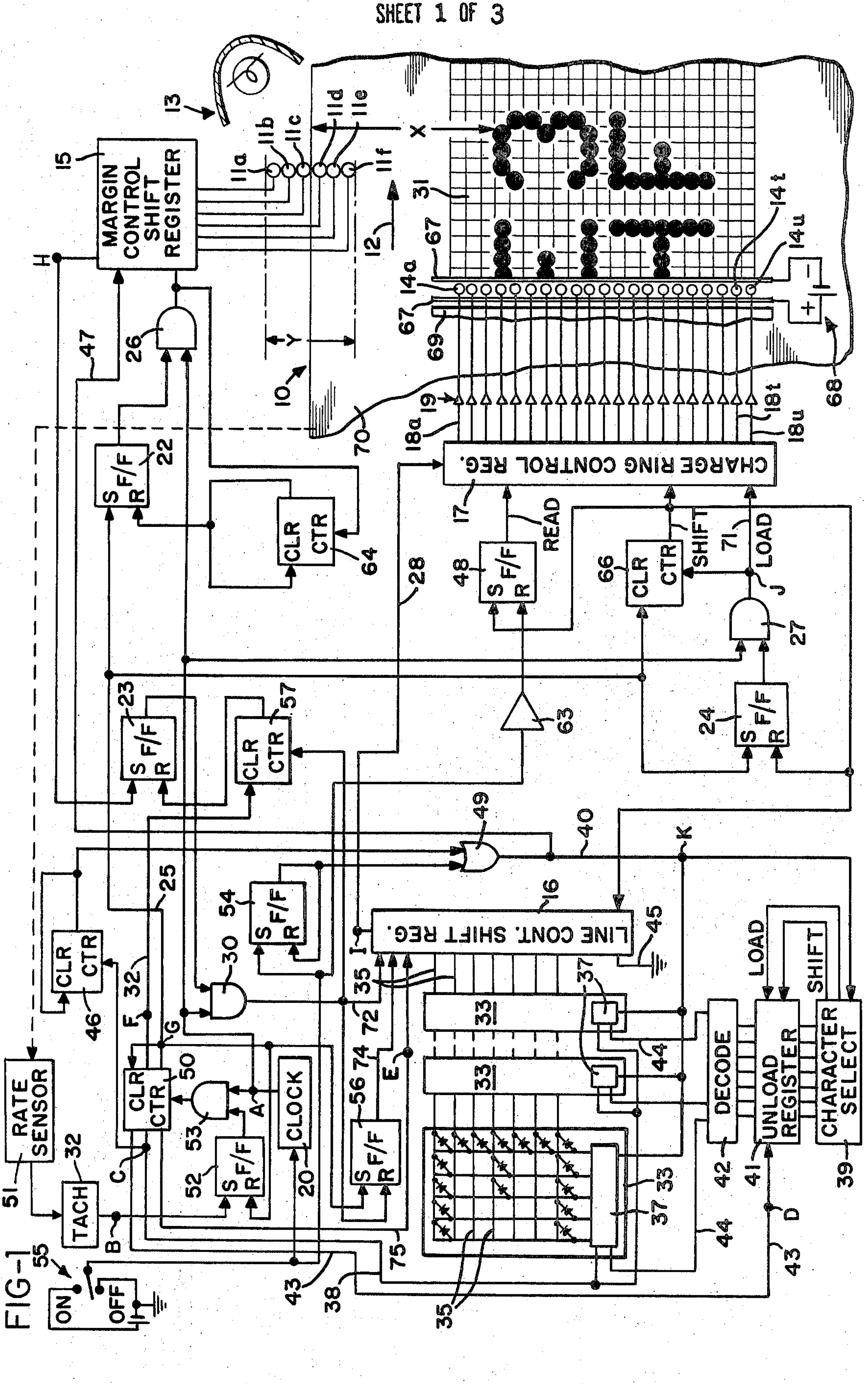
FIG. 1 is a schematic diagram of a preferred embodiment of the invention.

A preferred embodiment of the invention is illustrated in FIG. 1 wherein a document 10 is shown passing under a row of photosensors 11*a* through 11*f*. Photosensors 11 are arranged to observe the edge of document 10 as the document is being transported in the direction indicated by the arrow 12. Preferably document 10 is transported with a dark background thereagainst so that sensors 11 may easily and sharply sense the edge of the document. A bulb and reflector arrangement 13 may be arranged to illuminate the document edge.

For explanation purposes, the document is illustrated as being imprinted with a series of characters arranged in two spaced rows. In accordance with the practice of this invention the illustrated apparatus is operative to print the two spaced rows with the top of the upper row marginally spaced at a distance X from the edge of document 10. For an arrangement as illustrated, a correct margin X may be maintained for placement of document 10 with its edge anywhere within the illustrated region Y. It will be appreciated that this invention may be used in combination with other sensing apparatus which senses when a predetermined part of the document is in mark receiving position under the print head. Such an arrangement may control character placement in the direction parallel to the document edge, and thus enable printing within a predetermined two-dimensional area such as an information block on a preprinted business form.

The characters as illustrated in FIG. 1 are printed in matrix fashion by selective application of print signals to a series of marking elements 14*a* through 14*u* which scan successively over imaginary matrix cells 31. Preferably marking elements 14 are a series of charge rings for an ON/OFF ink jet printer, such as is disclosed, for instance, in Beam U.S. Pat. No. 3,577,198. Thus a series of uniformly sized and regularly spaced drops continually pass through each of charge rings 14. Character printing is controlled by permitting certain of the drops to deposit on document 10 and catching those drops which are not to be deposited. Catching is accomplished by applying a charge to the appropriate charge ring 14 during formation of any drop which is to be caught. The drop is correspondingly charged and thereafter is deflected by a steady state electrical field generated as by electrodes 67 which are connected to a voltage source 68. This causes the drop to be intercepted by a catcher 69, all as described in detail in the above-mentioned Beam patent.

It is significant to note that in such a jet drop printing system the drops which actually print are all uncharged, so that a logic reversal is required. That is, a logical zero must be applied to a marking element 14 when a printing mark is desired, and a logical one must be applied to the marking element when no printing mark is desired.

As illustrated in FIG. 1 there are 21 charge rings 14 controlling 21 jets (not shown) which in turn are arranged transverse to the edge 70 of document 10 for printing two rows of characters, each 7 cells high. Thus in an ideal case where the document to be printed is transported with no marginal positioning error, only 15 jets would be required to print the two illustrated rows of characters. (Only 14 jets if the jet between rows is deleted). The six extra jets are provided to accommodate the changing active area requirement associated with placement of the edge of document 10 at various locations within the region Y. THus if document 10 is placed with its edge 70 at the top of area Y for sensing by sensor 11*a*, then charge ring 14*a* will be switched on and off as required to print the top line of the top row of characters. At other times when the edge 70 of document 10 is placed at other locations within the region Y, charge ring 14*a* will be continuously charged for catching of all drops passing therethrough.

Photosensors 11 are connected for loading a margin control shift register 15, which in turn controls the initiation of information unloading from line control shift register 16. Line control shift register 16 is loaded with print data for the 15 printing cells of one column within the band to be printed, and this print data is unloaded from line control shift register 16 in serial fashion for serial loading into charge ring control register 17. Typically 16 bits of information will be unloaded from register 16, but register 17 will be loaded with 21 bits of information. The extra bits of information, which are used for margin control, are all zeros and are loaded into register 17 ahead of the serial print data from register 16 in sufficient number for correct margin adjustment. Thus for document positioning as illustrated in FIG. 1, three zeros are loaded into register 17 prior to the arrival of any serial print data from register 16. Thereafter 16 bits of information are transferred from register 16 to register 17. (The sixteenth bit is always zero because of a data peculiarity as hereinafter described). Finally two more zeros are loaded into register 17 to complete the data required for printing in the printing band as shown. Once register 17 has been loaded, the data is shifted to an output section within the register for application to a series of output lines 18*a* through 18*u*. The signals on lines 18 are all ones or zeros and each signal is held for a duration equal to the time required for a printing element to scan from one cell 31 to the next. A series of inverting amplifiers 19 invert the output of the lines 18, and amplify the inverted signal for application to charge rings 14. This inversion of the signals on lines 18 accomplishes the above-mentioned logic reversal.

Loading of the requisite number of zeros into register 17 ahead of the serial print data from register 16 is accomplished by a clock control arrangement comprising clock 20, counter 50, margin control shift register 15 and a set of flip-flops 22, 23, and 24. Counter 50 counts pulses from clock 20 and generates a "begin serial shift" pulse which is carried by line 25 to the set terminals of flip-flops 22 and 24. This enables a pair of AND gates 26 and 27 which thereupon begin supplying pulses from clock 20 to registers 15 and 17 respectively. THe pulses from AND gate 27 are applied to register 17 via line 71 to function as a serial load clock. Each time a pulse occurs on line 71, register 17 reads and shifts in the binary information appearing on line 28. Line 28 is the output line from register 16, and this line carries a zero logic signal until register 16 begins unloading. Thus when flip-flop 24 is set, shift register 17 begins loading zeros, and this loading of zeros continues until shift register 16 begins unloading logic information on line 28. Initiation of serial unloading from register 16 is under the control of flip-flop 23 which in turn is set by the output from shift register 15.

The loading of register 15 is initiated by a "read margin" pulse transmitted by OR gate 49 upon completion of the printing of each character set as hereinafter described. The "read margin" pulse is transmitted to register 15 by line 47, and this pulse causes the loading into register 15 of the output from sensors 11. It will be appreciated that each of sensors 11 is connected to a threshold device for transmitting zeros or ones to register 15 upon occurence of a "read margin" pulse on line 32. For the logic configuration illustrated, each of sensors 11 which are positioned inside the edge of document 10 generates a logical one whereas the sensors which are positioned beyond the edge of document 10 generates a logical zero.

When flip-flop 22 is set as aforesaid, the clock pulses transmitted by AND gate 26 produce a serial read out from register 15. This read out is from right to left as viewed in FIG. 1, so that register 15 initially begins reading out zeros corresponding to the outputs from sensors 11*a*, 11*b* and 11*c* when positioned as illustrated relative to the edge of document 10. Accordingly, the first three pulses from AND gate 26 will produce no output from register 15, but the fourth pulse will produce a "one" or HI output on line 29. This HI sets flip-flop 23 which in turn enables AND gate 30 to provide unload clock pulses via line 72 to register 16. Register 16 then begins a serial unload onto line 28, and loading of "print" data into register 17 commences. Thus the loading of print information into register 17 is adjusted in correspondence with the position of the edge of document 10 relative to photosensors 11.

The data from sensors 11 is loaded into a ring counter within margin control shift register 15, and six clock pulses from AND gate 26 are required to put register 15 into condition for controlling the next serial transfer of information over line 28. Thus there is provided a counter 64 which counts six pulses from AND gate 26 and then resets flip-flop 22. For the system as illustrated in FIG. 1, flip-flop 22 is set and reset seven times before a new "read margin" pulse appears on line 47. However, it will be appreciated that margin control shift register 15 may be easily controlled to read the output of sensors 11 at other intervals such as, for instance, only once per document or once every serial shift cycle.

Figure 2:
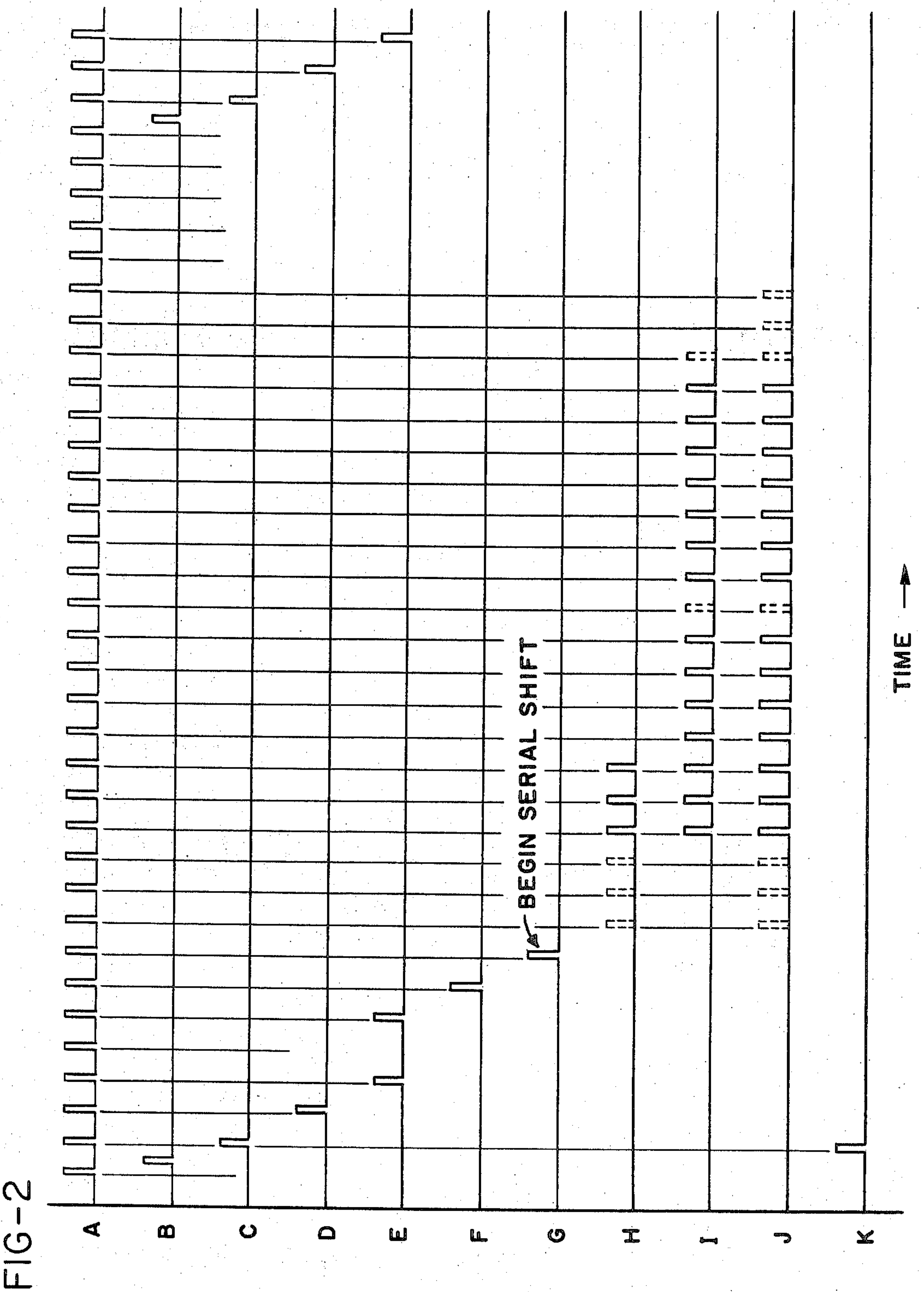
FIG. 2 is a timing diagram for the embodiment of FIG. 1.

The timing of the above described serial shift operation may be understood by referring to the simplified timing diagram of FIG. 2 and more particularly to time lines F through J therein. Each of the timing lines shown on FIG. 2 corresponds to one of the points A through K of FIG. 1. Time line A represents clock pulses from clock 20, and for explanation purposes each of the pulses in lines F through H is represented as occurring simultaneously with a corresponding pulse in line A.

The pulses on line B are pulses from a digital tachometer 32 which are generated for a purpose to be subsequently explained. The "begin serial shift" pulse occurs together with the seventh clock pulse following a pulse from tachometer 32. Thereafter margin control shift register 15 is triggered six times to produce six outputs as shown with reference to time line H. For positioning of document 10 as illustrated in FIG. 1, the first three outputs from register 15 will be zeros as denoted by the three dotted line pulses on time line H. The first "one" output from register 15 occurs simultaneously with the fourth clock pulse following occurrence of the "begin serial shift" pulse. Thereafter two more "one" pulses are gated out of register 15, but these latter two pulses produce no functional response within the system.

Simultaneously with the gating out of the first zero from register 15, a zero is gated into charge ring control register 17. This zero is represented by a dotted line pulse on time line J as are the two zeros which are gated into register 17 during the following two clock periods. Simultaneously with the occurrence of the first nonzero pulse at point H, line control shift register 16 unloads its first data pulse as illustrated with reference to time line I. It will be appreciated, however, that the first pulse on line I cannot in fact occur simultaneously with the first pulse on line H in any physical system and that the hardware as actually constructed will have built-in-time delays as required to compensate for unequal data clocking times through the various flip-flop strings.

Timing line I shows seven consecutive "ones" serially generated at the output terminal of register 16. These seven pulses may represent seven vertically arranged matrix cells for the vertical stroke of the capital letter E. The eighth gated output from register 16 is a zero, as denoted by a dotted pulse, to correspond to the horizontal row of matrix cells between the two illustrated rows of characters. Referring now to FIG. 1, it will be seen that there are seven input lines to register 16 from character matrices 33. There is also a "ground" line which serves as an eighth input to register 16, so that each character loaded into register 16 is effectively eight cells high with the eighth cell thereof being zero. THus the system prints two rows of characters which are vertically butted together, but which have an apparent inter-row spacing due to the unprinted eighth row in every character. If desired, register 16 may be gated to unload only 15 data bits, since the sixteenth bit shifted out of register 16 loads no information into register 17.

It should be understood that any of the "one" pulses on line I may be a "zero" depending upon the character being printed, but the illustrated "zero" pulses are always zero. Also, for each pulse appearing on time line I, there is a corresponding identical pulse on time line J. However, time line J has five additional "zeros" to complete a string of 21 pulses beginning simultaneously with the first gated output from register 15 (time line H).

FIG. 2 also illustrates the timing of signals appearing at points C, D and E of lines 38, 43 and 75 respectively. These signals are required for loading register 16 with the above mentioned 16 data bits which correspond to the graphic information in a single vertical column extending across the width of the band being printed. Thus the printer may print two rows of characters progressively as illustrated in FIG. 1. Obviously this technique may be extended to any number of row of characters. Furthermore the characters need not be letters or numbers, but may be any representation capable of being stored in matrix form.

Referring again to FIG. 2 it will be seen that a pulse occurs on time line C shortly after the occurrence of a tachometer pulse on time line B. This pulse on line C is used for shifting control within character matrices 33.

Character matrices 33 may be conventional read only memories with input lines 34 and output lines 35 as illustrated in FIG. 1 for only one of the matrices. Any number of character matrices may be employed depending upon printing requirements. A series of diodes 36 connect input lines 34 with selected ones of the output lines 35. Corresponding output lines 35 of each of character matrices 33 are connected together for transmission of signals thereon to line control shift register 16. Ordinarily only one character matrix is selected for operation at any one time so that register 16 loads information only from that matrix. Character matrices 33 each have a shift register 37 which is shifted from left to right by pulses on line 38 (time line C of FIG. 2) so that with each occurrence of a pulse on line 38 a different one of input lines 34 is activated. This produces logical information on output lines 35 corresponding to the printing information in one column of a character corresponding to the selected character matrix 33.

There is provided character select apparatus 39 which may be for instance a memory with a series of seven bit character codes stored therein. Any convenient character select apparatus may be employed, and in the case of a memory loaded with seven bit character codes, up to 128 different characters may be selected. For printing characters in two rows as illustrated in FIG. 1, the characters are loaded in character select apparatus 39 in pairs so that a character select pulse on line 40 may cause the selection of two characters such as for instance the characters 3 and F. The next character selector pulse on line 40 may select the characters E and H. The printed characters as illustrated in FIG. 1 are five columns wide, and there are two columns between characters, so that a character select pulse must be generated on line 40 at a frequency equal to one-seventh the frequency of the shift pulses on line 38.

While shift register 37 are shown as having five output lines, they actually have seven shift positions with the last two positions producing no output. This produces left to right character spacing. The character select pulses on line 40 are applied to shift register 37 to reset them after the seven position shift.

As mentioned above, character select apparatus 39 selects two characters upon occurrence of a pulse on line 40. Seven bit codes representing the two selected characters are loaded into character register 41. These character codes are alternately unloaded from register 41 into a decoder 42 in response to character shift pulses on line 43. Decoder 42 may be any convenient apparatus as for instance a series of inverters and AND gates which decode the seven bit codes from register 41 to activate corresponding character matrices 33. Activation of character matrices 33 is accomplished by means of HI signals on lines 44.

The timing of character selection and shifting is shown in FIG. 2 with reference to time lines C, D, E and K which illustrate the timing of signals appearing at points C, D. E and K respectively. Thus a shift pulse may appear at point C together with the appearance of a character select pulse at point K, but there will be six more pulses at point C before another pulse appears at point K. The pulse at point K resets registers 37 and causes two character codes to be loaded into register 41 as above described, and the pulse at point C causes all of shift registers 37 to activate the first of their output lines 34. A pulse at point D then causes the first character code to be unloaded from register 41 to the decoder 42 for selection of the corresponding character matrix 33. The output from the selector character matrix is applied to line control shift register 16 and loaded a first portion of register 16 by the occurrence of a pulse at point E. A second pulse at point D then produces selection of a new character matrix 33 corresponding to the second character code in register 41, and a second pulse at point E causes the output of this second character matrix to be loaded into a second portion of line control shift register 16. Shift register 16 is thus loaded with 14 bits of information from the first column of each of two selected matrices and two zeros from the line 45 which is corrected to ground. These 16 bits of information are then transferred in serial form to register 17 for printing control as above described. After the 16 bits of information have been shifted out of register 16, a pulse at point C causes each of shift registers 37 to activate its second output line 34 and thereafter two more pulses at points D and E cause the loading of 16 more bits of information into register 16. This continues until register 16 has been loaded seven times, but as mentioned above the sixth and seventh loadings load only zeros into register 16. Finally after register 16 has been loaded seven times a new character select pulse appears at point K to reset shift registers 37 and cause character select apparatus 39 to select two new characters.

The character select pulses which are applied to line 40 and observed at point K are normally generated by a counter 46, which effectively counts the data transfer cycles between registers 16 and register 17 by counting the line shift pulses as observed at point C. Counter 46 generates one character select pulse on line 73 for every eight line shift pulses.

The timing of the shifting of registers 37 as well as the unloading of register 41, the loading of register 16, the loading of register 15 and initiation of serial loading of register 17 are all controlled by counter 50. Input pulses to counter 50 are supplied by clock 20, and each complete counting cycle by counter 50 produces one pulse for counting by counter 46. Thus counter 46 controls the timing of selection of new character pairs, and counter 50 controls the timing of printing of new columns within those character pairs.

It will be appreciated that the timing of character printing must by synchronized with the movement of document 10. One simple way of accomplishing this is to control the movement of document 10 by apparatus driven by output pulses from clock 20. Another method as illustrated in FIG. 1 is to move document 10 by independently controlled apparatus (not illustrated) and to monitor this movement by a movement rate sensor 51. The output of sensor 51 is then applied to tachometer 32 which is connected to enable character printing. Thus the output pulses from tachometer 32 are applied to the set terminal of flip-flop 52 which in turn enables AND gate 53 to permit passage of clock pulses from clock 20 into counter 50. Flip-flop 52 is connected to be reset by "begin serial shift" pulses on line 25 so that tachometer 32 controls the iniation of each new counting cycle within counter 50. It will be appreciated, however, that the driving apparatus for document 10 is maximum rate limited because the system logic will not function properly if tachometer 32 sets flip-flop 52 during the serial shift operation.

As mentioned above the "character select" pulses are generated by counter 46 at the end of each complete count cycle, so that means must be provided for independent generation of the first character select pulse at the beginning of system operation. Many conventional ways are available to accomplish this, one of which is shown in FIG. 1 as comprising a flip-flop 54 connected to a switch 55. When switch 55 is turned ON a voltage is applied to the set terminal of flip-flop 54 which is positive edge triggered to produce a HI output. This output is applied to the reset terminal of flip-flop 54 so that flip-flop 54 generates a pulse each time switch 55 is moved from the OFF position to the ON position. This pulse from flip-flop 54 is applied through OR gate 49 to line 40. Switch 55 may also be connected to apply power to clock 20 as well as to other components within the system.

The operation of line control shift register 16 as above described may be accomplished by several known arrangements of logic components, and for some arrangements it may be desirable to provide a single input pulse to begin serial unload counting. Such pulses may be provided by flip-flop 56 which has its set terminal connected to point G and its reset terminal connected to the output side of a gate 30. Thus there is a HI signal initially present on line 74 to begin unloading of register 16 and this HI goes LO after the arrival of the first unload clock pulse from AND gate 30.

The unload clock pulses from AND gate 30 are also applied to counter 57. Counter 57 counts 16 pulses and then applies a reset pulse to flip-flop 23. This in turn disables AND gate 30 until register 15 again generates a HI on line 29. Counter 57 is cleared by a pulse which appears on line 32 and which is illustrated in FIG. 2 with reference to time line F.

As mentioned above lines 18 which are the output lines from register 17 must carry steady state signals which change each time a series of 21 new data bits are shifted to the output section of register 17. There is a counter 66 which counts the serial load pulses applied to register 17, and when 21 such pulses have been counted, counter 66 generates a shift pulse which causes parallel shifting of 21 data bits from the input to the output section of register 17 and the printing of a new column. The shift pulse applied from counter 66 to register 17 is also applied to the reset terminal of flip-flop 24 to disable AND gate 27 and prevent further input shifting of register 17. This shift pulse is also applied through AND gate 65 to the set terminal of unload flip-flop 48 thereby enabling read out of data bits from register 17 to lines 18. Flip-flop 48 is reset by a signal from inverter 63 when switch 55 is turned to the OFF position.

Figure 3:
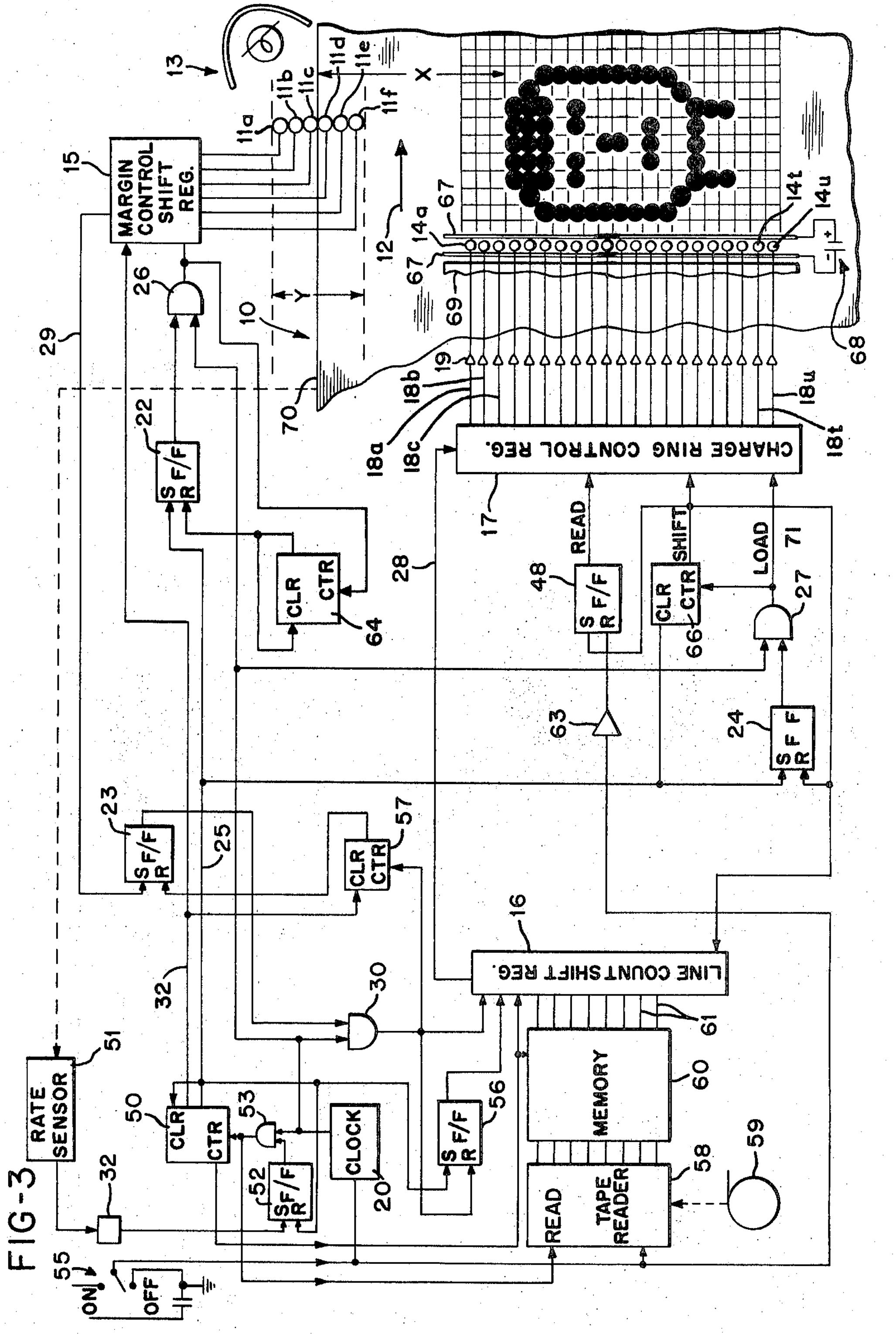
FIG. 3 is a schematic diagram of an alternative embodiment of the invention.

FIG. 3 illustrates an alternate embodiment wherein the system of this invention prints a band of graphic information which may or may not include identifiable characters. The system of FIG. 3 is similar to the system of FIG. 1 except for the matrix generating and control circuitry. Accordingly certain elements within the system of FIG. 3 are assigned the same reference numerals as their counterparts in the system of FIG. 1.

The system of FIG. 3 comprises a tape reader 58 which reads magnetically coded information on a tape 59 and transfers this information to a memory 60. Memory 60 has eight output lines 61 which correspond to the lines 35 and 45 of FIG. 1. Accordingly tape 59 may be an eight track tape formatted such that two bytes of information thereon correspond to the information to be printed within one column of 16 printing cells running transversely across the band to be printed. Accordingly two eight-bit-bytes are sequentially loaded into register 16, and thereafter the 16 bits of information so loaded are serially unloaded on line 28 for loading into register 17. Since tape 59 is formatted to contain all of the information within the band to be printed, there is no need to make special provision for non-printing areas within the printed band. Accordingly counter 46 is omitted in the system of FIG. 3. Counter 50 is still required, however, to control the serial shift of information from register 16 to register 17 and further to control the unloading of information from memory 60.

The alternate embodiment of FIG. 3 is also regulated by output signals from tachometer 32 which are applied to the set terminal of flip-flop 52. As before, flip-flop 52 enables AND gate 53 which in turn applies clock signals to counter 50. Output clock signals from AND gate 53 are applied to tape reader 58 to control the reading operation thereof.

It is to be noted that the embodiment of FIG. 3 differs from the embodiment of FIG. 1 in that margin control shift register 15 reads the output of sensors 11 once per serial shift cycle rather than once per seven serial shift cycles. Thus the reading control terminal of register 15 is connected to receive its input from line 32, and accordingly the pulses from counter 50 which clear counter 57 also function as "read margin" pulses for register 15. This provides a margin which is continually being readjusted.

In a still further embodiment of the invention a memory such as memory 60 of FIG. 3 may be loaded with information generated by an optical scanner or other input device. In other embodiments of the invention the jet drop markers may be arranged in a plurality of rows as shown for instance in Taylor et al. U.S. Pat. No. 3,560,641 or in Mathis U.S. Pat. No. 3,701,998. Further, so long as the marking elements are capable of interchangeable printing control, they may take forms such as pin electrodes, laser beams, ion beams, or markers which actually strike the document.

While the forms of apparatus herein described constitute preferred embodiments of the invention, it is to be understood that the invention is not limited to these precise forms of apparatus, and that changes may be made therein without departing from the scope of the invention.

What is claimed is:

1. Method of marking a band of graphic information within a defined area on the face of a document comprising the steps of:

1. transporting said document through a printing region in marking relationship to a row of marking elements collectively extending across a zone wider than said defined area,
2. sensing the transverse positioning of said document to determine which ones of said marking elements are in marking relationship with said defined area,
3. generating a set of control signals collectively representing said band of graphic information, and
4. shifting said control signals to said ones of said marking elements to mark said graphic information.

2. Apparatus for imprinting a band of graphic information within a defined area on the face of a document comprising:

a. means for progressively transporting said document through a marking zone, b. a plurality of functionally identical marking elements arranged at spaced positions within said marking zone for marking coverage of an area wider than said defined area, c. means for producing a set of marking control signals collectively representing the band of information to be printed, d. means for shifting said marking signals to those of said marking elements positioned for marking coverage of said defined area.

3. Apparatus according to claim 1 said shifting means comprising means for sensing the location of said defined area relative to said marking elements.

4. Apparatus according to claim 3 said sensing means comprising means for sensing an edge of said documents.

5. Apparatus according to claim 4 said sensing means comprising a plurality of photo detectors.

6. Apparatus according to claim 3 said marking elements comprising streams of regularly generated drops of marking liquid arranged for selective charging and catching in response to said marking signals.

7. Apparatus according to claim 3 said shifting means comprising a register connected for driving control of all of said marking elements, means responsive to said sensing means for defining which portion of said register drives those of said marking elements positioned as aforesaid for marking coverage of said defined area, and means for directing said marking signals to the portion of said register so defined.

8. Apparatus according to claim 7 said means for directing said marking signals to said portion of said register comprising a second register for receiving and storing said marking signals and means for transferring the information so stored in serial form from said second register to said portion of the first aforesaid register.

9. Apparatus according to claim 8 said means for transferring said information comprising a third register connected for receiving and storing document location defining information from said sensing means and operative in response thereto for initiating said transfer.

10. Apparatus according to claim 9 said means for shifting said marking signals further comprising a tachometer connected to sense the rate of movement of said document, and all of said registers being connected for timing control by said tachometer.

11. Apparatus according to claim 8 said means for producing a set of marking control signals comprising a set of preprogrammed character matrices and means for selectively controlling said matrices to produce said information.

12. Apparatus according to claim 8 said means for producing a set of marking control signals comprising a preprogrammed magnetic tape and means for reading said tape.

13. Apparatus for marking a band of information on a moving document comprising:

means for sensing an edge of said document during the movement thereof, a plurality of marking elements positioned at different distances from said edge, means for generating marking control signals representing said band of information and formatted for reproducing said band of information by control of less than all of said marking elements, and means responsive to said sensing means for selecting particular ones of said marking elements for control by said last named means whereby said band of information is marked with its marginal edge located at a predetermined distance from said document edge.

14. Apparatus for marking a band of information on a moving document comprising:

a. means for sensing the location of an edge of said document during the movement thereof, b. a plurality of marking elements arranged at different distances from said edge, c. means for controlling a portion of said marking elements to print said band of information, and d. means responsive to said sensing means for designating which of said marking elements will be controlled by said control means and thereby causing the marginal edge of said band to be located at a predetermined distance from said document edge.

15. Jet drop printing apparatus comprising:

a. means for generating a row of jet drop streams, b. a series of charging electrodes for selective charging of drops within said streams, c. means for deflecting and catching those of said drops which are charged as aforesaid, d. means for progressively transporting a document across the paths of said streams, e. means for sensing the transverse positioning of said document relative to said streams, f. means responsive to said sensing means for designating certain ones of said electrodes as active printing electrodes, and g. means for directing variable charging signals to those of said electrodes so designated and directing steady state charging signals to all other electrodes.

* * * * *

PO-1050
(5/69)

UNITED STATES PATENT OFFICE
CERTIFICATE OF CORRECTION

Patent No. 3,803,628 Dated April 9, 1974

Inventor(s) Russell H. Van Brimer, Edward R. Thomas, Dale R. Beam

It is certified that error appears in the above-identified patent and that said Letters Patent are hereby corrected as shown below:

Column 10, line 39 "claim 1" should be --claim 2--

Signed and sealed this 3rd day of December 1974.

(SEAL)
Attest:

McCOY M. GIBSON JR.
Attesting Officer

C. MARSHALL DANN
Commissioner of Patents